United States Statutory Invention Registration [19]

[11] Reg. Number: H677

Lambright [43] Published: Sep. 5, 1989

[54] MOTOR CONTROL CIRCUIT

[75] Inventor: John E. Lambright, Port Orange, Fla.

[73] Assignee: The United States of America as represented by the Secretary of the Army, Washington, D.C.

[21] Appl. No.: 924,942

[22] Filed: Oct. 23, 1986

[51] Int. Cl.[4] ..... H02K 11/00

[52] U.S. Cl. ..... 310/68C

*Primary Examiner*—Thomas H. Tarcza
*Assistant Examiner*—Linda J. Wallace
*Attorney, Agent, or Firm*—Anthony T. Lane; Harold H. Card, Jr.; Michael C. Sachs

[57] ABSTRACT

Described is a control circuit or energizing circuit for a series field motor. To limit the surge of inrush startup current to no greater than the steady-state running current, a series string of three thermistors is inserted in series with the motor. The thermistors have negative temperature coefficient, and have nominally equal ratings and values. The circuit has application in motor/-blower systems.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MOTOR CONTROL CIRCUIT

The invention described herein may be manufactured, used and licensed by or for the Government for Governmental purposes without the payment to me of any royalties thereon.

BACKGROUND OF THE INVENTION

Field of the Invention

This invention relates to motor control circuits, which could also be considered as motor energization circuits. More particularly, the invention is directed to, and has for an object provision of, a circuit effective to insure that the controlled motor shall draw essentially the same magnitude motor-energizing current when it starts up as it draws while in steady-state running condition, and no greater than the running current.

The invention has application in a motor/blower system using series-field-type (or simply "series") universal motors. Such a motor characteristically draws a very high starting current (in a conventional energization circuit), which may be up to ten times its running current.

In a working embodiment of the invention an alternating current universal series motor was employed. However, the invention could be utilized with direct current series field type motors, and in applications other than motor/blower systems, i.e. in other applications where limitation of starting current is desirable.

In arriving at the present invention, several approaches were considered, but had to be rejected for reasons discussed below. Solid state silicon-controlled-rectifier control or triac control had to be ruled out because of excessive electromagnetic interference generated by switching transients.

Another approach was to place a negative temperature thermistor in series with one of the motor leads. The thermistor chosen was capable of handling the currents (5 amp per motor) and limiting the starting current to the maximum running current. However, the time constant of the thermistor did not sufficiently match the startup time (or "starting time constant") of the motor and its load, here the blower. The lack of success in this approach led to the successful approach of the invention.

SUMMARY OF THE INVENTION

In accordance with the invention, the single thermistor mentioned above is replaced by a circuit arrangement of plural thermistors having a composite time constant which matches that of the motor/load combination.

More specifically, selected were three thermistors of lower resistance value, and connected in series with each other and with the motor lead. The three thermistors had identical nominal ratings as to initial ("cold") and final ("hot") resistance values, and current ratings. This matched the motor startup characteristics and effectively limited the inrush current.

BRIEF DESCRIPTION OF THE DRAWINGS

The invention will be better understood from the followup, more detailed specification of which the appended Claims and Abstract form parts, when considered together with the accompanying drawing, in which:

DESCRIPTION OF PREFERRED EMBODIMENT

Figure 1:
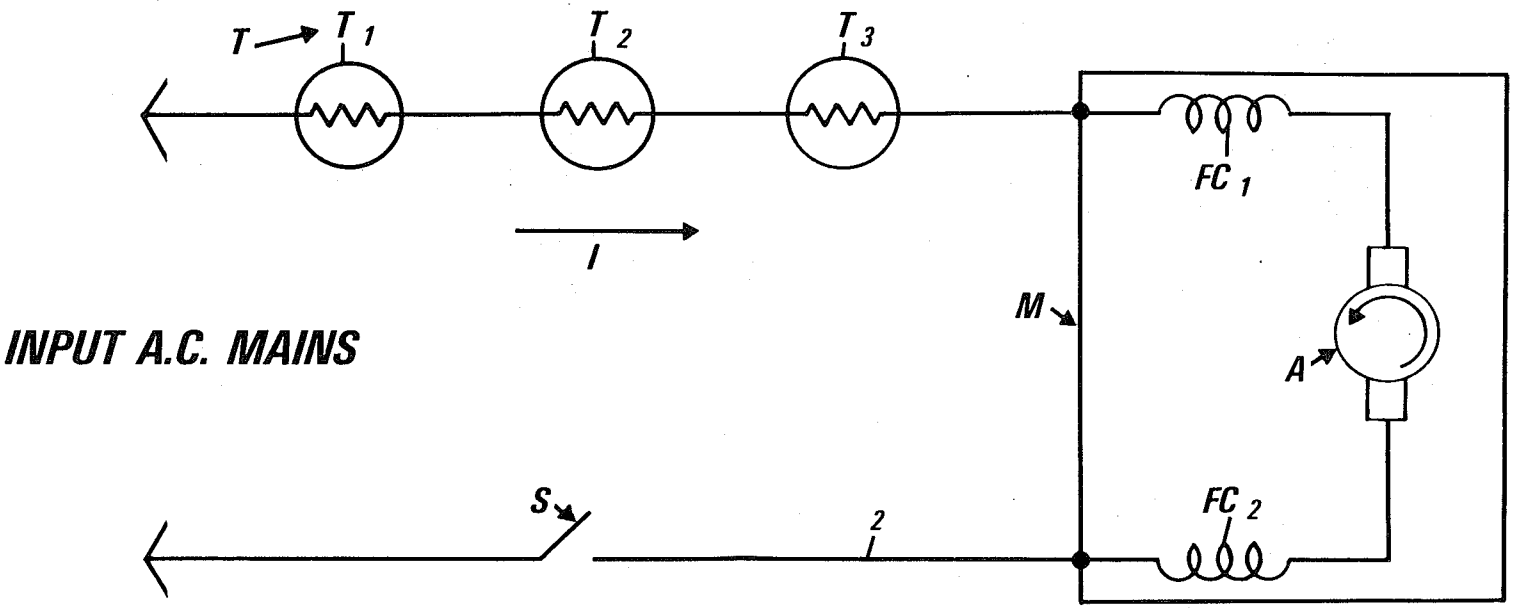
FIG. 1 is a schematic drawing of a motor control circuit in accordance with a preferred embodiment of the invention.

Referring to FIG. 1, shown therein is a motor control circuit or energization circuit in accordance with a preferred embodiment of the invention. The motor M comprises armature A, and in series circuit relation therewith, two series field coils FC1 and FC2 which are circuit-wise located on either side of the armature A, and from which outgo the motor leads 1 and 2 respectively. Connected in series with lead 1 is a string of series connected thermistors referred to as a group as T, and individually and in left-to-right order (leading to lead 1) as T1, T2, T3. The thermistor T1 is connectible to one side or line of the single-phase alternating current (AC) energizing mains, whereas the lead 2 is connectible to the other side or line via on/off switch S. Motor current is indicated by I.

In the preferred embodiment which was actually constructed and successfully tested, each thermistor T had a nominal resistance value of 30 ohms at a temperature of 25° C., and of 0.1 ohms at 150° C.

Figure 2:
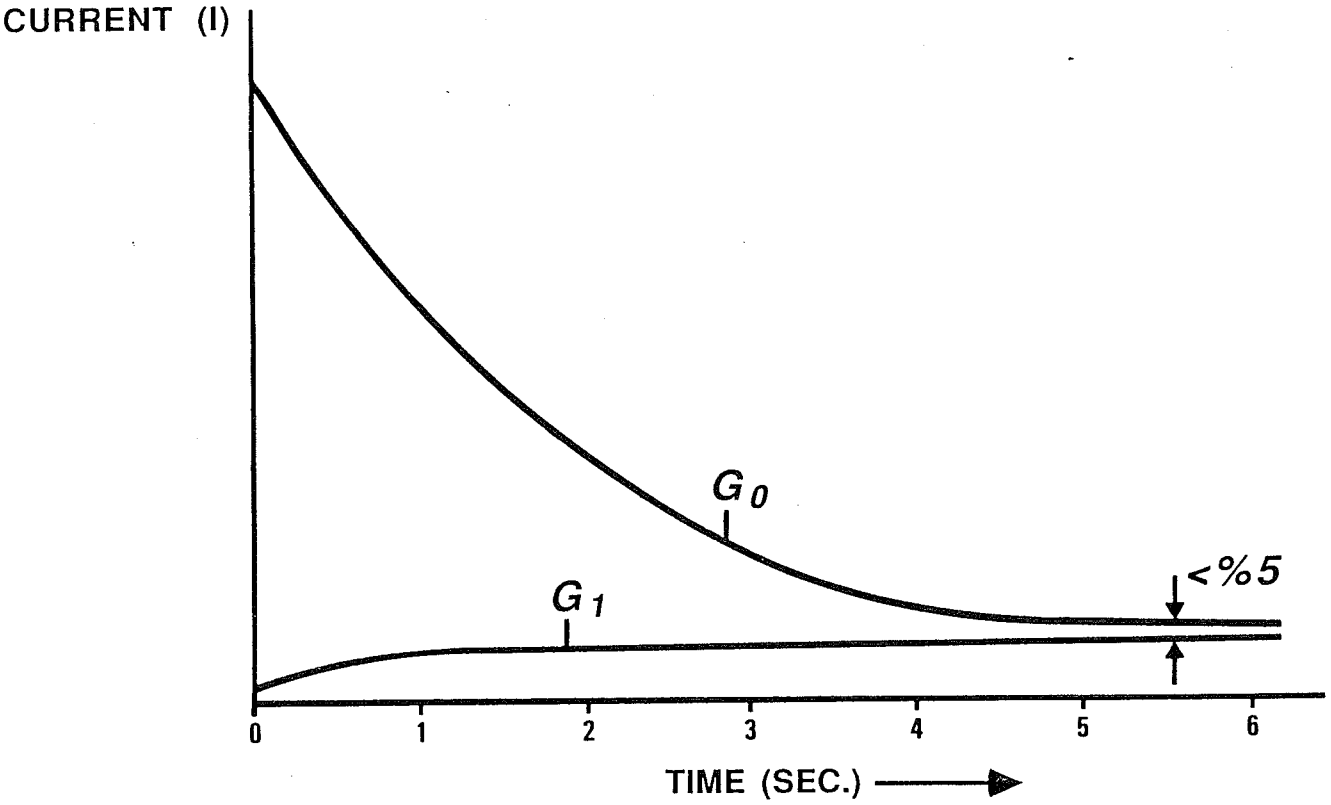
FIG. 2 are graphs of current-magnitude vs. time for a conventional motor energization circuit and that of FIG. 1.

FIG. 2 illustrates the effects on input current or energizing current as a result of the insertion of the thermistors T in series with the motor. In FIG. 2, the graph G0 is a plot of input or energizing current vs. time for the motor of the motor/blower system here under contemplation, utilizing conventional input-connections to the motor, i.e. lacking surge protection; G1 is the plot for the same motor and same motor/blower system but employing surge protection, i.e. the inventive control circuit of FIG. 1.

As may be seen from the graph G0, the conventional approach produces an initial inrush current ten times the magnitude of the running current. In contrast, graph G1 indicates that the startup current at no time exceeds the running current. The insertion of the thermistors does produce a reduction in operating current, even under running steady-state-condtions, vis-a-vis the running current of the conventional energizing circuit, but the reduction is less than 5%. In testing the actually constructed embodiment of the invention, the less than 5% reduction did not adversely affect motor/blower operation.

The described invention admits of several modifications. For example, it is readily adaptable to direct current motor systems in place of alternating current motor systems. Also, the invention is applicable to other motor-field circuit configurations, so long as one of the field coils is in series with the armature. Furthermore, other plural thermistor circuit combinations, besides the series of three, may provide the correct time constant for matching the motor current-time characteristics.

I claim:

1. A motor control circuit for a series field type motor comprising the motor and its series field, and connected in series therewith, a plurality of series-connected thermistors.

2. A motor control circuit according to claim 1, wherein the thermistors have negative temperature co-efficients.

3. A motor control circuit according to claim 2, wherein the thermistors have substantially the same value.

4. A motor control circuit according to claim 3, wherein the number of series connected thermistors is three.

5. A motor control circuit according to claim 4, wherein each thermistor has a nominal value of 30 ohms at 25° C.

6. A motor control circuit according to claim 1, wherein the motor is an alternating current series motor, and the circuit is energized by an alternating current source.

7. A motor control circuit according to claim 1, wherein the motor is incorporated in a motor/blower system.

* * * * *